No. 790,191. PATENTED MAY 16, 1905.
L. P. COWART.
DIPPER.
APPLICATION FILED APR. 18, 1903.

Witnesses
Harry L. Ames.
A. G. Heylman.

Inventor
Lawrance P. Cowart.
By Victor J. Evans
Attorneys

No. 790,191. Patented May 16, 1905.

UNITED STATES PATENT OFFICE.

LAURANCE P. COWART, OF SILSBEE, TEXAS.

DIPPER.

SPECIFICATION forming part of Letters Patent No. 790,191, dated May 16, 1905.

Application filed April 18, 1903. Serial No. 153,310.

*To all whom it may concern:*

Be it known that I, LAURANCE P. COWART, a citizen of the United States, residing at Silsbee, in the county of Hardin and State of Texas, have invented new and useful Improvements in Dippers, of which the following is a specification.

This invention relates to dippers such as are provided with means for securing them to the rim of the vessel.

The objects of the invention are to simplify and improve the construction of such devices.

With the foregoing objects in view the invention resides in the precise combination and arrangement of parts and in the exact details of construction hereinafter described and claimed as a practical embodiment thereof.

Figure 1:
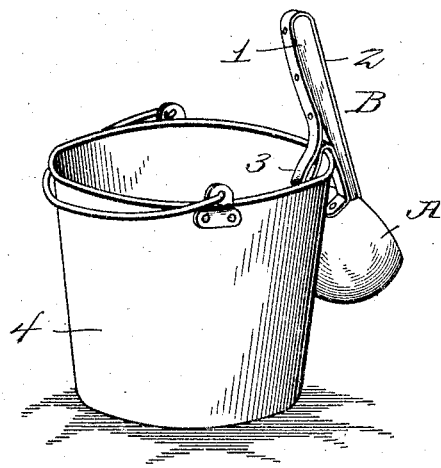
Figure 2:
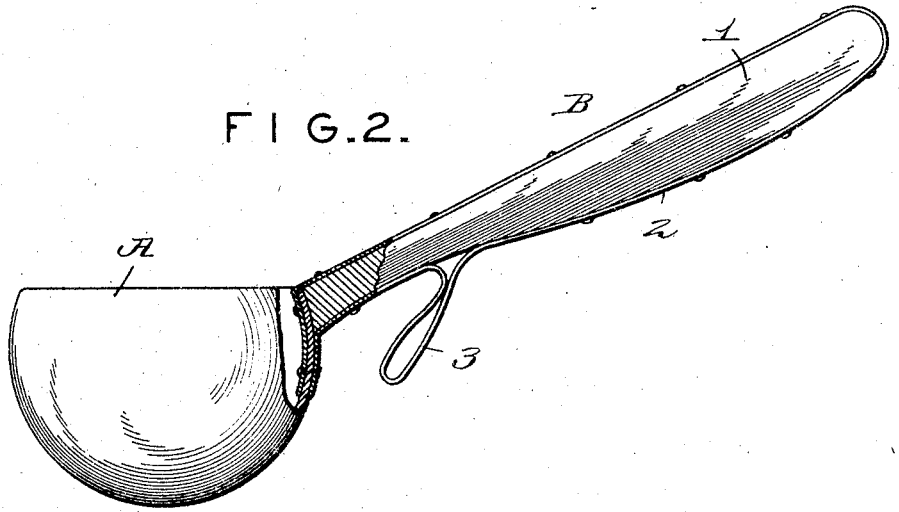

In the accompanying drawings, Figure 1 is a perspective view of a dipper constructed in accordance with the invention shown in engagement with a bucket. Fig. 2 is a side elevation, partly in section, of the improved dipper.

The reference-letter A indicates the bowl of the dipper, and B the handle. The handle B preferably is formed of wood, as shown at 1, and at its lower end abuts directly against the bowl A, the upper portion of the handle being thickened. Secured to the bowl A of the dipper below the handle 1 is a strip 2 of metal, which extends longitudinally along the under surface of the handle 1 and is secured thereto by suitable nails or rivets. Adjacent to the bowl A the strip 2 is bent downwardly to form a loop, which is directed toward the lower portion of the bowl, the outer portion of the loop being open, as shown in Fig. 2, so as to avoid the necessity of forming the strip 2 with a sharp crease or bend, which would weaken the same at the end of the loop. After forming the loop 3 the strip 2 is continued longitudinally along the under surface of the handle 1 and is bent around the upper end thereof, after which it continues longitudinally along the upper surface of the handle and is bent sharply down into the bowl A of the dipper, the two ends of the strip terminating in the same plane, one on the inside and the other on the outside of the bowl.

The improved dipper is secured to the receptacle 4, as shown in Fig. 1.

In its precise combination and arrangement of parts and in its exact details of construction the dipper of this invention constitutes a simple and inexpensive improvement over prior devices intended for a similar purpose.

Having thus described the invention, what is claimed as new is—

As a new article of manufacture, a dipper comprising a bowl, a handle abutting in its lower end against said bowl, and a strip secured at one end to the outside of said bowl below said handle, said strip extending longitudinally along the under surface of the handle, around the upper end thereof along the upper surface thereof and being bent sharply down inside the bowl, the two ends of said strip terminating in the same plane and being secured to the inside and outside of the dipper, respectively, said strip being formed on the under surface of the handle with a loop having an open outer end, substantially as illustrated and described.

In testimony whereof I affix my signature in presence of two witnesses.

LAURANCE P. COWART.

Witnesses:
C. L. FORTENBERRY,
E. K. WARD.